C. R. HURLBURT,
Car Spring.
No. 22,292.
Patented Dec. 14, 1858.
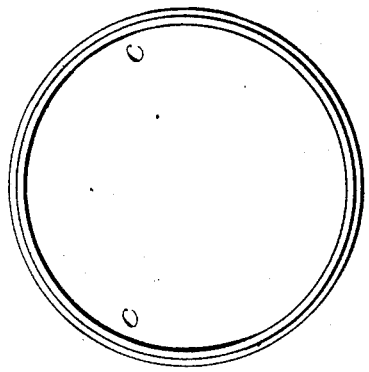
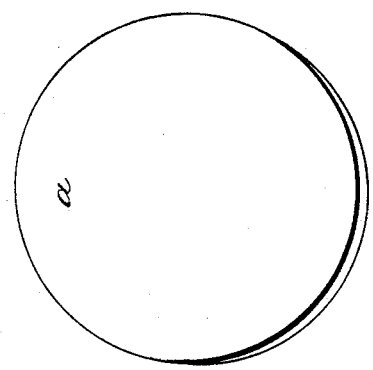
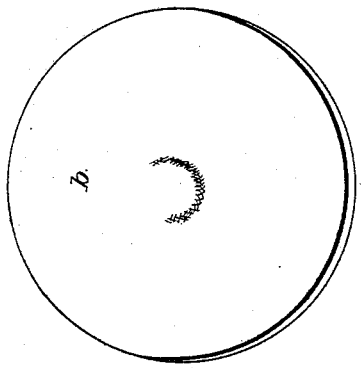
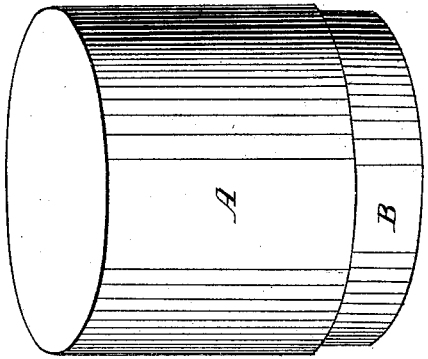
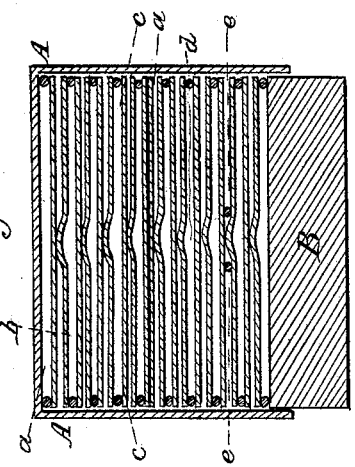

UNITED STATES PATENT OFFICE.

CHAS. R. HURLBURT, OF SEYMOUR, CONNECTICUT.

CAR-SPRING.

Specification of Letters Patent No. 22,292, dated December 14, 1858.

*To all whom it may concern:*

Be it known that I, CHARLES R. HURLBURT, of the town of Seymour, in the county of New Haven and State of Connecticut, have invented a new and useful Improvement in Car-Springs; and I do hereby declare that the following is a full, clear, and exact description of the construction, character, and operation of the same, reference being had to the accompanying drawings, which make a part of this specification, in which—

Figure 1, is a perspective view of the case, and piston, of the spring, as they will appear when the spring is in use. Fig. 2, is a section of the same, cut vertically through the center, showing the position and arrangement, of the several parts. Fig. 3, is a view of one of the plane disks. Fig. 4, is a view of one of the raised disks, as shown at $b$, Fig. 2. Fig. 5, is a view of one of the rings against which the plane disks press, as at $c, c$, Fig. 2. Fig. 6, is a view of a small ring, which may be used in the center, as at $e, e$.

My improvement consists in constructing the spring with a case, in which I place a series of metal rings, and sheet metal disks, one half, or less than one half, of which disks, have a raised portion in the center, so as to give the spring alternately, from the center, and the periphery; and with a suitable piston to press upon the rings and disks in the case.

I make the case, A, of cast iron, or any other suitable material, substantially as shown in Fig. 1, and indicated, in section, in Fig. 2, at A, A, of sufficient depth to contain the required number of rings, and disks, to give the requisite power; and of such diameter as to give the proper extent of motion without unduly straining the disks, substantially, as represented, in section, in Fig. 2.

I make the rings of iron wire, or any other suitable material, substantially, as shown in Fig. 5, and indicated at $c, c,$ &c. Fig. 2.

I make the disks, Figs. 3 and 4, of sheet steel, or any other suitably elastic sheet metal, one half, (at least) of them, (as Fig. 3,) plane as shown, in section, at $a$, Fig. 2, and the remainder, (as Fig. 4,) raised, to a small extent, in the center, as shown at $b$, Fig. 2.

I make the piston, B, of cast iron, or any other suitable material, of sufficient strength to sustain the pressure, substantially, as shown in Figs. 1, and, in section in Fig. 2.

Having made the parts, as before described, I turn the case, A, bottom upward, and drop in a ring, (Fig. 5,) as represented near A, A, onto which ring, I drop, or place, a plane disk, (Fig. 3,) as represented at $a$, Fig. 2. I then place a raised disk, (Fig. 4,) onto the plane disk, with the raised center toward it, as shown at $b$, Fig. 2. On this I place another ring—another plane disk, and another raised disk, alternately, until the case, A, is sufficiently filled, all as represented, in section, in Fig. 2.

If thought best, in any case, two plane disks may be placed together, as shown at $d$, Fig. 2, to give greater power. And, also, a small ring may be placed in the center, as shown at $e, e$, Fig. 2,—but I recommend the mode particularly described.

The case, A, and piston, B, are to be attached to the cars in any of the usual ways, (with the piston downward, to avoid dust, &c.)

The advantages of my improvement consist in that it makes a very simple, compact, cheap, and serviceable spring, which may be readily applied to all carriages:—and should one of the disks get damaged or broken, the spring may still be used, (though not so usefully,) and, at a convenient time, the injured disk may be removed, and another put in its place, without the loss of any of the other parts of the spring, which would be a great convenience, as well a great saving of expense.

What I claim as my invention, and desire to secure by Letters Patent, is—

The combination of the two kinds of disks, (Figs. 3, and 4,) plane, and raised, with the rings, (Fig. 5,) when the whole is constructed, combined, and arranged, substantially as herein described.

CHAS. R. HURLBURT.

Witnesses:
    D. ELLIS,
    R. FITZGERALD.